(12) United States Patent
Nagai et al.

(10) Patent No.: US 7,122,752 B2
(45) Date of Patent: Oct. 17, 2006

(54) VEHICLE INTERIOR ILLUMINATION LAMP

(75) Inventors: Kentaro Nagai, Haibara-gun (JP); Yoshinori Hirayama, Yokohama (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/120,945

(22) Filed: May 4, 2005

(65) Prior Publication Data

US 2005/0258023 A1 Nov. 24, 2005

(30) Foreign Application Priority Data

May 21, 2004 (JP) ............................ P2004-151840

(51) Int. Cl.
*H01H 9/00* (2006.01)

(52) U.S. Cl. ...................... 200/315; 200/313
(58) Field of Classification Search ................ 200/315, 200/553, 339, 310–317

See application file for complete search history.

(56) References Cited

U.S. PATENT DOCUMENTS

| | | | |
|---|---|---|---|
| 5,053,591 A * | 10/1991 | Theurer ...................... 200/315 |
| 5,557,081 A | 9/1996 | Clevenger et al. |
| 6,013,885 A * | 1/2000 | Kowalczyk ................. 200/315 |
| 6,617,535 B1 * | 9/2003 | Lacroix ....................... 200/339 |

FOREIGN PATENT DOCUMENTS

| | | |
|---|---|---|
| DE | 31 16 757 | 11/1982 |
| EP | 1 227 003 A2 | 7/2002 |
| EP | 1 281 572 A2 | 2/2003 |
| JP | 2002-79879 A | 3/2002 |

OTHER PUBLICATIONS

Patent Abstracts of Japan, Publication No. 2002079879, Mar. 19, 2002; Toyota Motor Corp.

\* cited by examiner

*Primary Examiner*—Richard K. Lee
(74) *Attorney, Agent, or Firm*—Sughrue Mion, PLLC (57) ABSTRACT

A vehicle interior illumination lamp 11 for mounting in an opening formed in an interior member of a vehicle includes a function portion 12 having a bulb 22 serving as a light source and a switch lever 74 for effecting and interrupting the supply of electric power to the bulb 22, and a design portion 13 having a cover lens 42 covering the function portion 12 and a switch knob 47 for operating the switch lever 74. The switch lever 74 is pivotally mounted on the function portion 12, and the switch knob 47 is pivotally mounted on the design portion 13. When the function portion 12 and the design portion 13 are combined together, shaft portions 78, serving as an axis of pivotal movement of the switch lever 74, coincide with shaft portions 84 serving as an axis of pivotal movement of the switch knob 47.

2 Claims, 13 Drawing Sheets

VEHICLE INTERIOR ILLUMINATION LAMP

BACKGROUND OF THE INVENTION

1. Field of the Invention

This invention relates to an interior illumination lamp for a vehicle which is mounted within a room of the vehicle.

2. Related Art

Figure 15:
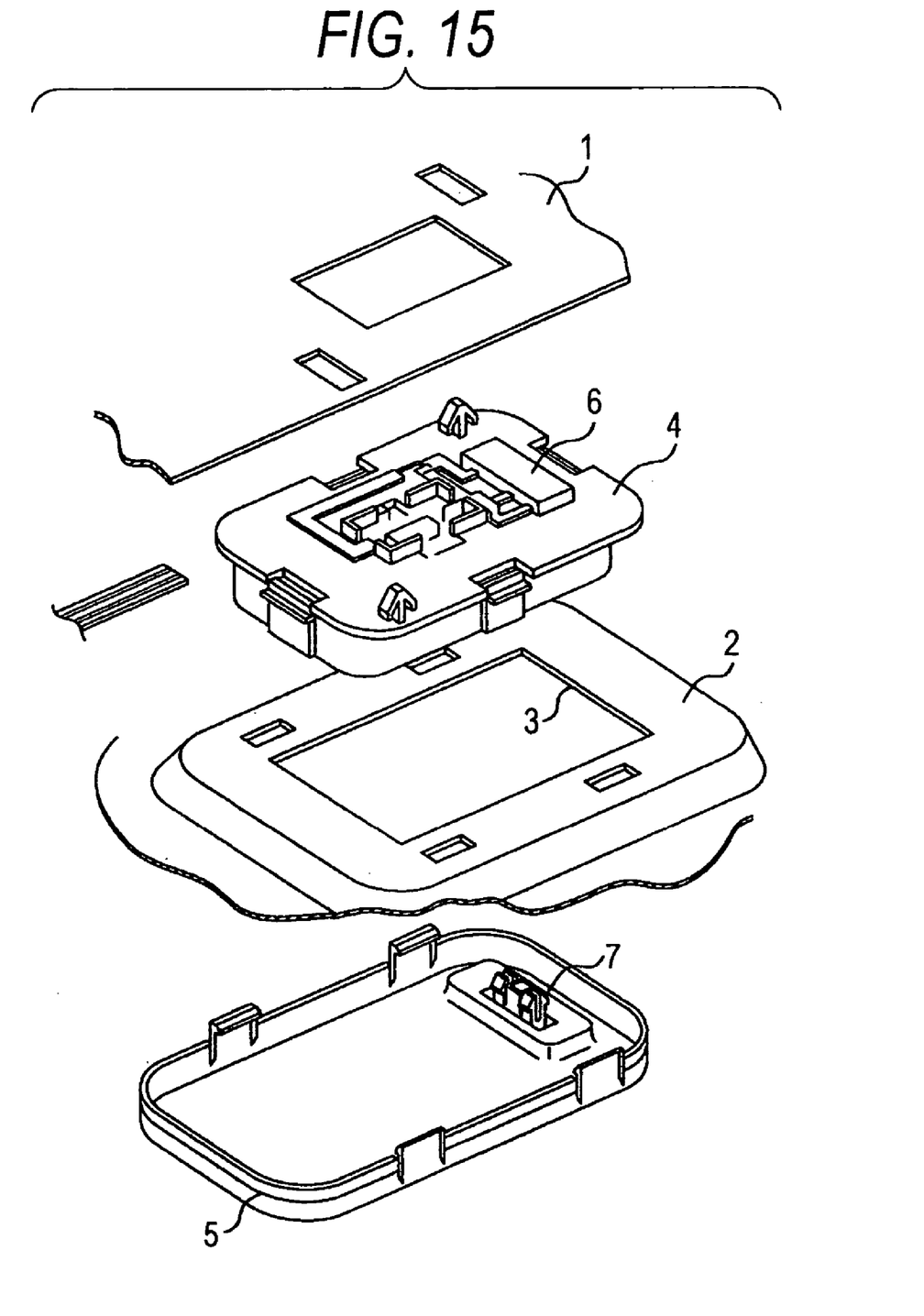
FIG. 15 is an exploded, perspective view of a conventional vehicle interior illumination lamp.

Generally, a vehicle has an interior illumination lamp mounted on a ceiling thereof. As shown in FIG. 15, one known such interior illumination lamp includes a function portion 4 which is fixed to a ceiling 1 of a vehicle body, and is partially exposed through an opening 3 formed through a ceiling plate (interior member) 2, and a design portion (cover lens) 5 which is fitted into the opening 3 in the ceiling plate 2 from the inside of a vehicle room, and is attached to the function portion 4 (see, for example, Unexamined Japanese Patent Publication 2002-79879).

Figure 16:
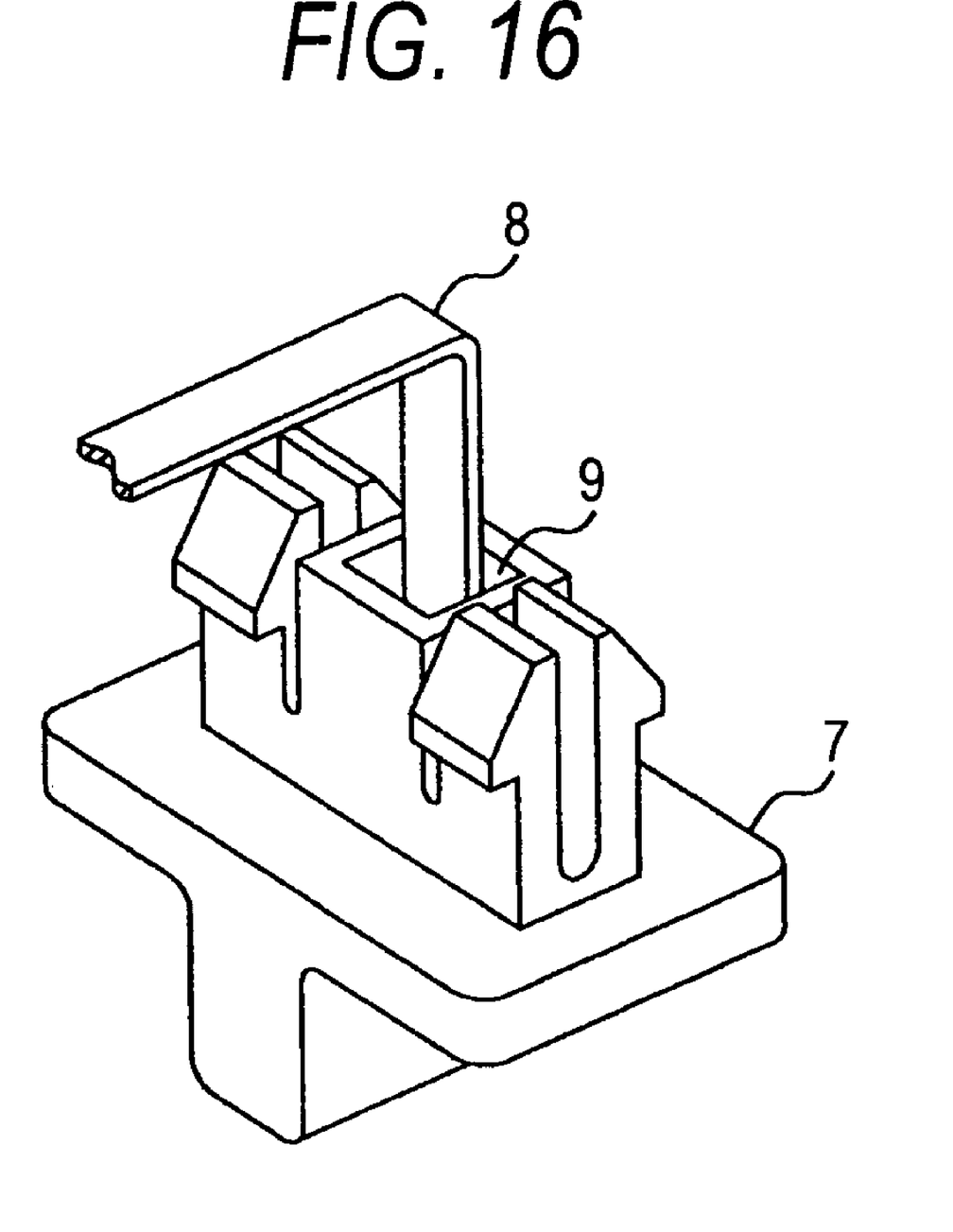
FIG. 16 is an enlarged perspective view of a switch unit of FIG. 15.

This interior illumination lamp includes a switch 6 provided at the function portion 4, and a slidable switch knob 7 provided at the design portion 5. When the design portion 5 is to be attached to the function portion 4, a slider 8 of the switch 6 is engaged in an engagement portion 9 (in the form of a recess) formed in the switch knob 7 as shown in FIG. 16, and by doing so, the switch 6 can be operated by sliding the switch knob 7.

In the interior illumination lamp of the above construction, if the slider 8 of the switch 6 is disposed out of registry with the engagement portion 9 of the switch knob 7 at the time of attaching the design portion 5 to the function portion 4, the slider 8 can not be engaged in the engagement portion 9, and interferes with other portion than the recess of the engagement portion 9, so that the lamp can not be smoothly assembled.

Therefore, it is necessary that the slider 8 of the switch 6 and the engagement portion 9 of the switch knob 7 should be disposed accurately in registry with each other at the time of attaching the design portion 5 to the function portion 4, and therefore the assembling operation has been cumbersome.

SUMMARY OF THE INVENTION

This invention has been made in view of the above circumstances, and an object of the invention is to provide an interior illumination lamp for a vehicle in which the efficiency of an assembling operation can be enhanced.

The above object has been achieved by a vehicle interior illumination lamp of the present invention having features recited as follows:

A vehicle interior illumination lamp for mounting in an opening formed in an interior member of a vehicle; provided in that: the lamp comprises: a function portion including a light source, and a switch lever for effecting and interrupting the supply of electric power to the light source; and a design portion including a cover lens covering the function portion, and a switch knob for operating the switch lever; and the switch lever is pivotally mounted on the function portion; and the switch knob is pivotally mounted on the design portion; and when the function portion and the design portion are combined together, an axis of pivotal movement of the switch lever coincides with an axis of pivotal movement of the switch knob.

The vehicle interior illumination lamp, recited in the described above, is further provided in that the switch lever has an engagement portion; and the switch knob has an engaging portion for fitting to the engagement portion of the switch lever; and when the function portion and the design portion are combined together, the engaging portion and the engagement portion are fitted together, so that the switch lever and the switch knob are guided into their respective proper mounting postures.

In the vehicle interior illumination lamp of described above, the switch lever is pivotally mounted on the function portion, and the switch knob is pivotally mounted on the design portion. When the function portion and the design portion are combined together, the axis of pivotal movement of the switch lever coincides with the axis of pivotal movement of the switch knob. Therefore, in the operation for combining the function portion and the design portion together, it is not necessary to effect an operation for brining the switch lever and the switch knob into registry with each other, and therefore the efficiency of the operation for combining the function portion and the design portion together is greatly enhanced, thus enhancing the production efficiency.

In the vehicle interior illumination lamp of the described above, when the engagement portion of the switch lever and the engaging portion of the switch knob are fitted together, the switch lever and the switch knob are guided into their respective proper mounting postures. Therefore, in the operation for combining the function portion and the design portion together, it is not necessary to beforehand bring the switch lever and the switch knob into agreement with each other with respect to their posture. And besides, the switch lever and the switch knob are interlocked by fitting the engagement portion and the engaging portion together, and thus it is not necessary to retain the switch lever and the switch knob relative to each other by retaining projections or the like, and therefore the efficiency of an operation for separating the switch lever and the switch knob (that is, for separating the function portion and the design portion) from each other is enhanced, and the maintenance can be effected easily.

In the present invention, there can be provided the vehicle interior illumination lamp in which the efficiency of the assembling operation is enhanced, and besides the efficiency of the separating operation is enhanced, thereby enabling the maintenance to be effected easily.

DETAILED DESCRIPTION OF THE PREFERRED EMBODIMENTS

A preferred embodiment of the present invention will now be described in detail with reference to the drawings.

FIRST EMBODIMENT

Figure 1:
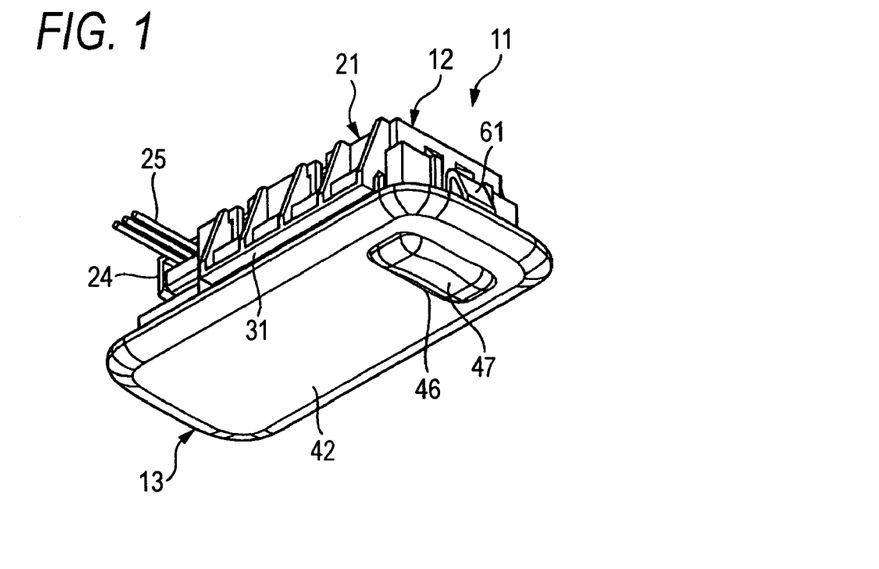
FIG. 1 is a perspective view of a first embodiment of a vehicle interior illumination lamp of the present invention.
Figure 2:
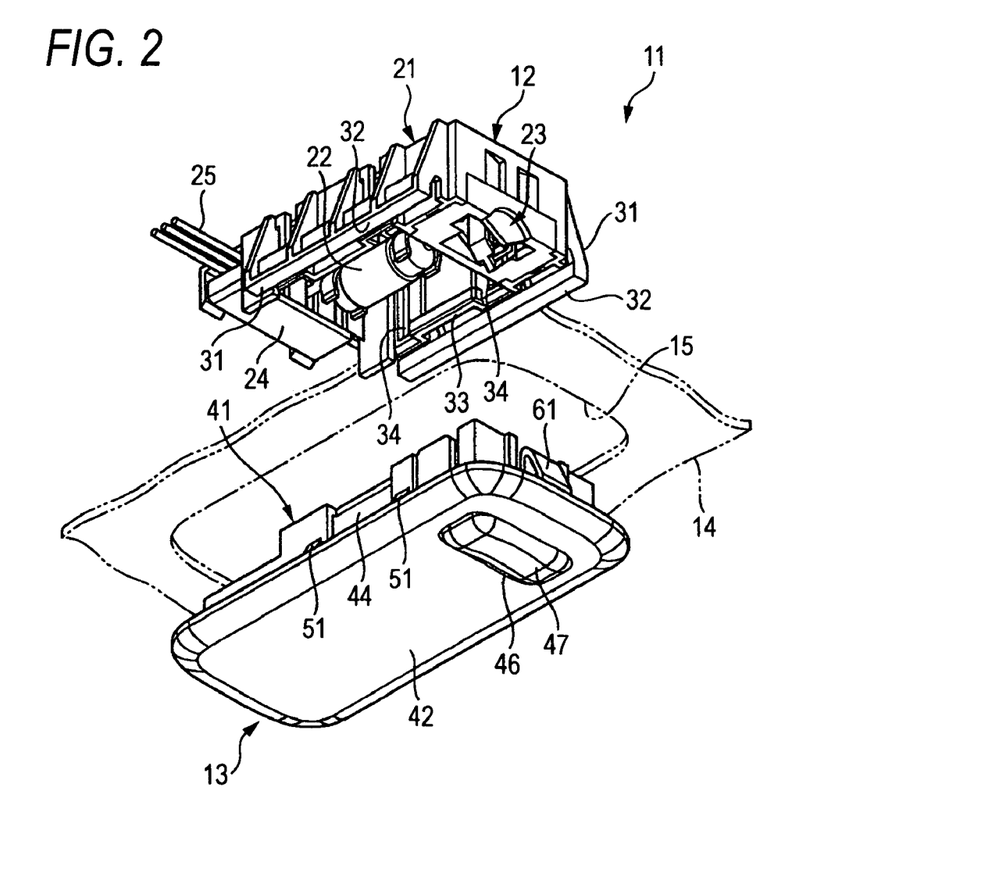
FIG. 2 is an exploded, perspective view of the vehicle interior illumination lamp of FIG. 1.
Figure 3:
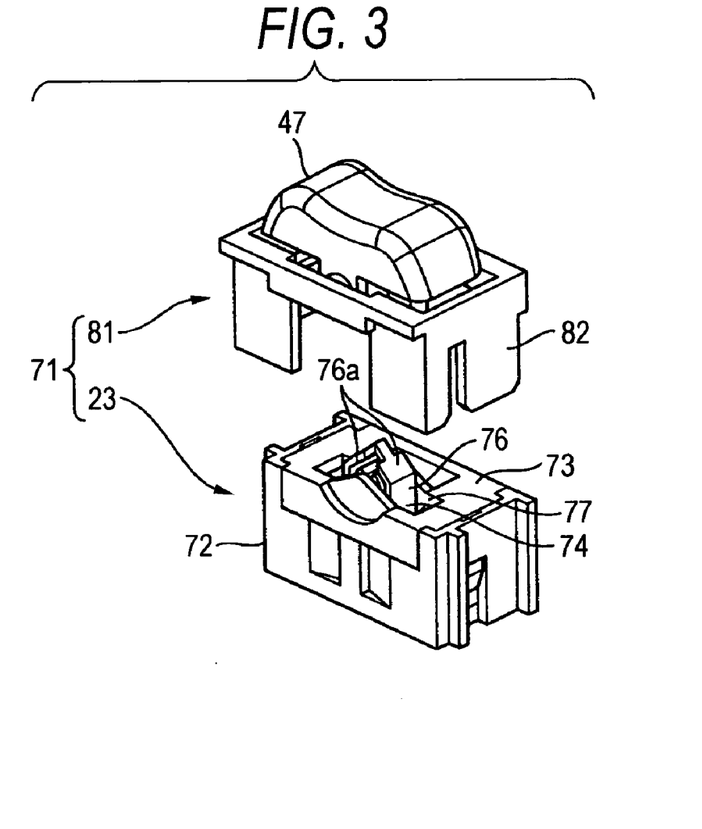
FIG. 3 is a perspective view of a switch unit of the vehicle interior illumination lamp of FIG. 1.
Figure 4:
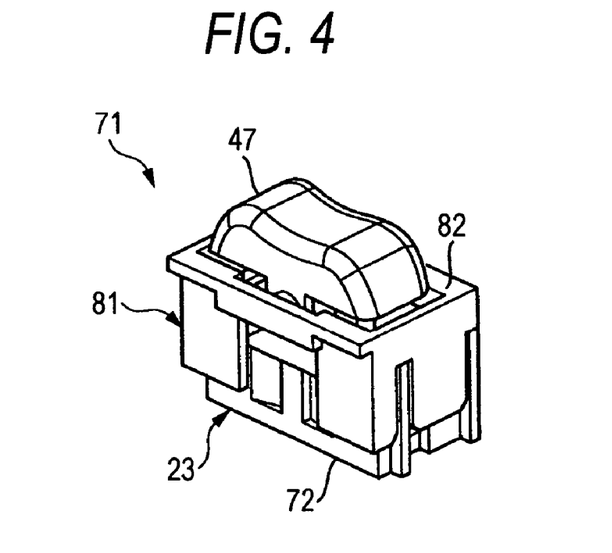
FIG. 4 is a perspective view of the switch unit of FIG. 3 in its assembled condition.
Figure 5:
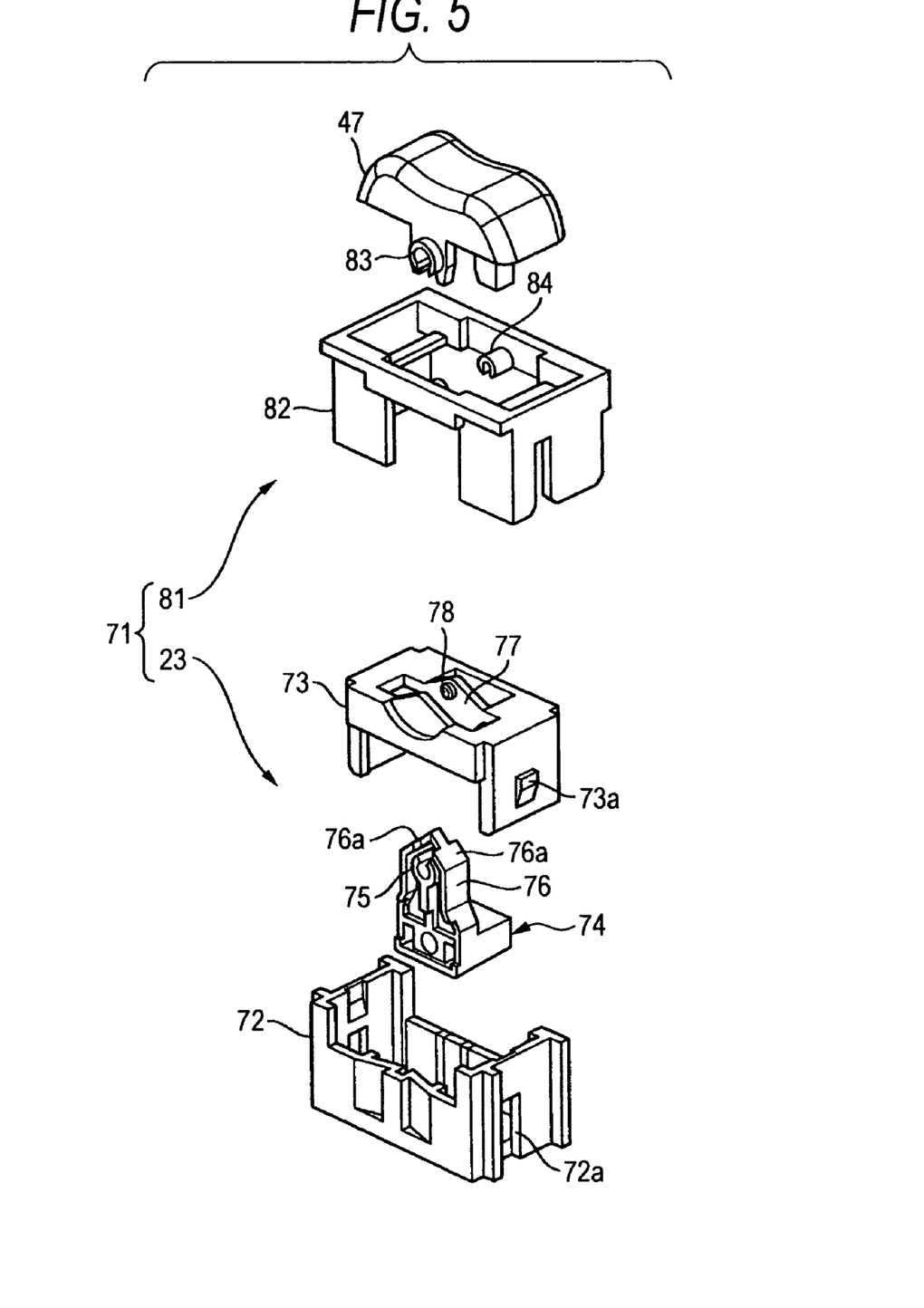
FIG. 5 is an exploded, perspective view of the switch unit of FIG. 3.
Figure 6:
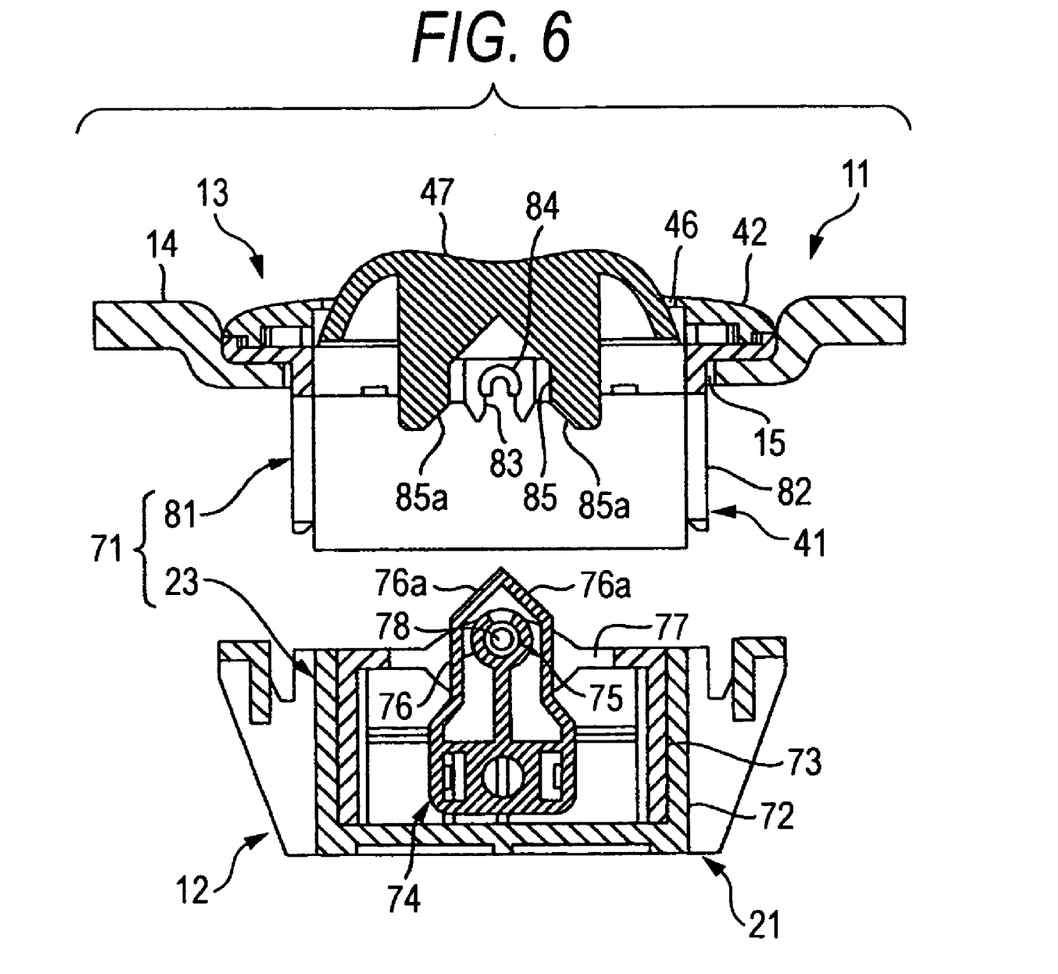
FIG. 6 is a cross-sectional view of the switch unit of FIG. 3.

FIG. 1 is a perspective view of a first embodiment of a vehicle interior illumination lamp of the invention, FIG. 2 is an exploded, perspective view of the vehicle interior illumination lamp of FIG. 1, FIG. 3 is a perspective view of a switch unit of the vehicle interior illumination lamp of FIG. 1, FIG. 4 is a perspective view of the switch unit of FIG. 3 in its assembled condition, FIG. 5 is an exploded, perspective view of the switch unit of FIG. 3, and FIG. 6 is a cross-sectional view of the switch unit of FIG. 3.

As shown in FIGS. 1 to 6, the vehicle interior illumination lamp 11 comprises a function portion 12, and a design portion 13.

The function portion 12 is disposed at a reverse side of a ceiling plate 14 forming a ceiling of a vehicle, and is mounted thereon to be exposed to an opening 15 of a generally rectangular shape formed through the ceiling plate 14. The design portion 13 is mounted in such a manner that it fitted in the opening 15 in the ceiling plate 14.

The function portion 12 includes a housing 21 of an integral construction molded of a synthetic resin. A bulb (light source) 22 and a switch mechanism 23 (which are electrical parts) are provided within the housing 21.

The function portion 12 has a connection portion 24 formed at one end portion thereof, and a wire harness 25 is supported in this connection portion 24. At this connecting potion 24, wires of the wire harness 25 are electrically connected to contacts of bus bars (not shown) connected to the bulb 22 and the switch mechanism 23.

The housing 21 has support portions 31 formed respectively at opposite sides thereof. A support surface 32 is formed on each of the support portions 31, and extends in a longitudinal direction, and these support surfaces 32 can abut against the ceiling plate 14.

The housing 21 also has retaining plates 33 disposed inwardly respectively of the support portions 31. Each of the retaining plates 33 has retaining portions 34 each in the form of a notch, and retaining claws 51 (described later) of the design portion 13 can be retainingly engaged with the retaining portions 34, respectively.

The design portion 13 includes a housing 41 of a generally rectangular tubular shape, and the retaining claws 51 are formed on and project laterally from opposite side portions of this housing 41. The retaining claws 51 can be retainingly engaged respectively with the retaining portions 34 formed at the retaining plates 33 of the function portion 12. The housing 41 also has retaining claws 61 formed respectively at opposite end portions thereof. When the housing 41 is fitted into the opening 15 in the ceiling plate 14, the retaining claws 61 are engaged with a peripheral edge portion of the opening 15 in the ceiling plate 14, thereby holding the housing 41 on the ceiling plate 14.

A bulb receiving chamber 44 is formed within the housing 41, and has an insertion port at an open top of the housing 41 disposed at the ceiling. The bulb 22, mounted on the function portion 12, is inserted into the bulb receiving chamber 44 through the insertion port, and is received therein. An operating mechanism 81 (described later) is mounted on the housing 41, and this operating mechanism 81 and the switch mechanism 23, mounted on the function portion 12, jointly form the switch unit 71.

Next, the switch unit 71 will be described.

The switch mechanism 23 of the switch unit 71 includes a switch base 72 molded integrally with the housing 21 of the function portion 12.

A switch cover 73 is fitted in the switch base 72, and a switch lever 74 is received within the switch cover 73. The switch cover 73 has retaining claws 73a formed respectively on opposite side surfaces thereof. When the switch cover 73 is fitted into the switch base 72, the retaining claws 73a are retainingly engaged respectively in retaining holes 72a formed respectively in opposite side portions of the switch base 72, thereby combining the switch base 72 and the switch cover 73 together in a unitary manner.

The switch lever 74 includes an engagement portion 76 having bearing holes 75 formed respectively in opposite side surfaces thereof, and this engagement portion 76 is inserted into an opening 77 formed in the switch cover 73. A pair of projecting piece portions are formed on and project upwardly from opposite side edges of the opening 77, respectively, and shaft portions 78 for fitting respectively in the bearing holes 75 formed in the engagement portion 76 of the switch lever 74 are formed respectively on opposed inner surfaces of these projecting piece portions. The shaft portions 78 are fitted respectively in the bearing holes 75 in the engagement portion 76 of the switch lever 74.

The switch lever 74 is supported on the switch cover 73 so as to be pivotally moved about the shaft portions 78 fitted in the respective bearing holes 75. By pivotally moving the switch lever 74, the vehicle interior illumination lamp 11 is turned on and off (that is, the supply of electric power to the bulb 22 is effected and interrupted) via the contacts (not shown) provided at the function portion 12.

The operating mechanism 81 includes a base housing 82 molded integrally with the housing 41, and a switch knob 47 is received within the base housing 82. A pair of projecting piece portions are formed on and project downwardly from opposite side edges of a bottom surface of the switch knob 47, respectively, and bearing holes 83 are formed in distal end portions of these projecting piece portions, respectively. Shaft portions 84 for fitting respectively in the bearing holes 83 are formed respectively on opposed inner side surfaces of the base housing 82.

The switch knob 47 is inserted into the base housing 82, and the shaft portions 84 of the base housing 82 are fitted respectively in the bearing holes 83 in the switch knob 47. By doing so, the switch knob 47 is supported within the base housing 82 so as to be pivotally moved about the shaft portions 84 fitted in the respective bearing holes 83.

A pair of tapering surfaces 76a are formed at a distal end portion of the engagement portion 76 of the switch lever 74, and are slanting to approach the centerline (axis) of the engagement portion 76 gradually toward the distal end thereof. An engaging portion 85, having a generally channel-shaped groove corresponding in shape to the distal end portion of the engagement portion 76 of the switch lever 74, is formed on and projects downwardly from the bottom surface of the switch knob 47. The engagement portion 76 of the switch lever 74 can be fitted in the engaging portion 85 of the switch knob 47.

Tapering surfaces 85*a* are formed at opposed edge portions of the channel-shaped groove in the engaging portion 85, and are slanting to approach the centerline (axis) of the engaging portion 85 gradually in a direction of insertion of the engagement portion 76 of the switch lever 74 (that is, toward the bottom of the channel-shaped groove).

Figure 7:
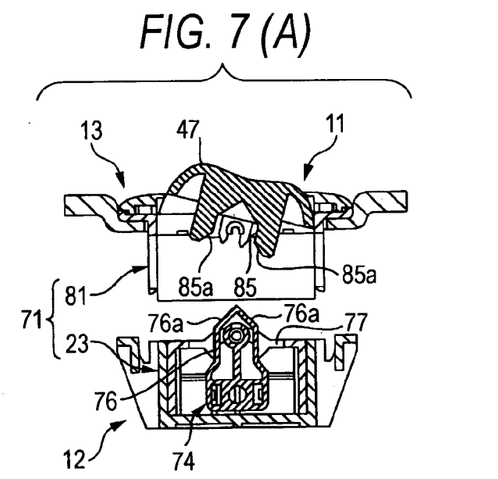
FIGS. 7A to 7D are cross-sectional views showing the procedure of assembling the switch unit of FIG. 6.
Figure 8:
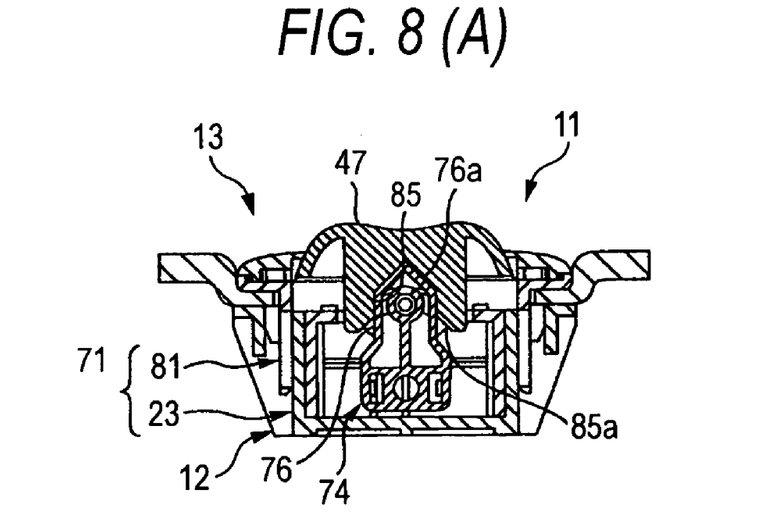
FIGS. 8A and 8B are cross-sectional views showing the procedure of disassembling the switch unit of FIG. 7D.

Next, a method of assembling the vehicle interior illumination lamp 11 will be described with reference to FIGS. 7 and 8. FIGS. 7A to 7D are cross-sectional views showing the procedure of assembling the switch unit of FIG. 6, and FIGS. 8A and 8B are cross-sectional views showing the procedure of disassembling the switch unit of FIG. 7D.

For assembling the vehicle interior illumination lamp 11, the function portion 12 is fitted on the design portion 13 mounted on the ceiling plate 14 through the retaining claws 61 of the housing 41 engaged with the peripheral edge portion of the opening 15 in the ceiling plate 14 as shown in FIG. 7A.

In this operation, the switch base 72 of the function portion 12 is inserted into the base housing 82 of the design portion 13 as shown in FIG. 7B. Here, when the function portion 12 and the design portion 13 are combined together, the axis of pivotal movement of the switch lever 74 coincides with the axis of pivotal movement of the switch knob 47 (that is, the shaft portions 78, serving as the axis of pivotal movement of the switch lever 74, are aligned with the shaft portions 84 serving as the axis of pivotal movement of the switch knob 47). Therefore, when the switch base 72 is inserted into the base housing 82, the shaft portions 78 are disposed in registry with the shaft portions 84 in the inserting direction, and therefore it is not necessary to effect an operation for bringing the switch lever 74 and the switch knob 47 into registry with each other.

In the case where the switch knob 47 is disposed in an inclined posture, the tapering surface 76*a*, formed at the distal end portion of the engagement portion 76, abuts against the tapering surface 85*a* formed at the engaging portion 85 of the switch knob 47.

In this condition, when the function portion 12 is further pushed toward the design portion 13, the tapering surfaces 76*a* and 85*a*, held against each other, slide relative to each other, and therefore the switch knob 47 is pivotally moved about the shaft portions 84 to be guided into a proper mounting posture, so that the switch knob 47 and the switch lever 74 correspond in posture (inclination) with each other as shown in FIG. 7C. A resistance is imparted to the switch lever 74 because of contact of the contacts (not shown) with each other, and therefore the switch lever 74 will not be pivotally moved, while the switch knob 47 is pivotally moved.

When the function portion 12 is further pushed toward the design portion 13, the engagement portion 76 of the switch lever 74 is inserted into the channel-shaped groove in the engaging portion 85 of the switch knob 47, and therefore is fitted in the engaging portion 85, as shown in FIG. 7D.

At this time, the projecting piece portions on which the shaft portions 78 (serving as the axis of pivotal movement of the switch lever 74) are formed, respectively, are disposed between the projecting piece portions of the switch knob 47 in which the bearing holes 83 are formed, respectively, and the shaft portions 78, serving as the axis of pivotal movement of the switch lever 74, are disposed in alignment with the shaft portions 84 serving as the axis of pivotal movement of the switch knob 47.

At this time, also, the retaining claws 51 on the design portion 13 are engaged respectively in the retaining portions 34 formed in the retaining plates 33 of the function portion 12, and also the support surfaces 32, formed respectively on the support portions 31 of the function portion 12, abut against the upper surface of the ceiling plate 14, so that the support surfaces 32 and a peripheral edge portion of a cover lens 42 of the housing 41 of the design portion 13 hold the peripheral edge portion of the opening 15 in the ceiling plate 14 therebetween.

In the thus assembled vehicle interior illumination lamp 11, the switch lever 74 and the switch knob 47 are combined together in an unitary manner, and in accordance with the pressing of the switch knob 47, the switch lever 74 is pivotally moved, so that the contacts are switched, thereby effecting and interrupting the supply of electric power to the bulb 22.

For disassembling the vehicle interior illumination lamp 11 in its assembled condition as shown in FIG. 8A, the engagement of the retaining claws 51 of the design portion 13 with the respective retaining portions 34 of the retaining plates 33 of the function portion 12 is canceled, and the function portion 12 and the design portion 13 are moved apart from each other.

In this operation, the engagement portion 76 of the switch lever 74 is easily withdrawn from the engaging portion 85 of the switch knob 47, and also the switch base 72 is withdrawn from the base housing 82, so that the function portion 12 and the design portion 13 are separated from each other.

As described above, in the vehicle interior illumination lamp 11 of the above embodiment, when the function portion 12 and the design portion 13 are combined together, the shaft portions 78 are disposed in alignment with the shaft portions 84, so that the axis of pivotal movement of the switch lever 74 coincides with the axis of pivotal movement of the switch knob 47. Therefore, in the operation for combining the function portion 12 and the design portion 13 together, it is not necessary to effect an operation for bringing the switch lever 74 and the switch knob 47 into registry with each other, and the efficiency of the operation for combining the function portion 12 and the design portion 13 together is greatly enhanced, thus enhancing the production efficiency.

While guiding the switch knob 47 into the proper mounting posture, using the tapering surfaces 76*a* of the engagement portion 76 of the switch lever 74 and the tapering surfaces 85*a* of the engaging portion 85 of the switch knob 47 as guide surfaces, the engagement portion 76 is fitted into the engaging portion 85, thereby combining the switch lever 74 and the switch knob 47 together in a unitary manner. Therefore, in the operation for combining the function portion 12 and the design portion 13 together, it is not necessary to beforehand bring the switch lever 74 and the switch knob 47 into agreement with each other with respect to their posture. Therefore, the efficiency of the operation for combining the function portion 12 and the design portion 13 together can be greatly enhanced, thus enhancing the production efficiency.

And besides, the switch lever 74 and the switch knob 47 are interlocked merely by fitting the engagement portion 76 into the engaging portion 85, and therefore for example, as compared with the case where the switch lever and the switch knob are interlocked through retaining projections or the like retaining them relative to each other, the efficiency of the operation for separating the function portion 12 and the design portion 13 from each other can be enhanced, and the maintenance can be easily effected.

SECOND EMBODIMENT

Figure 9:
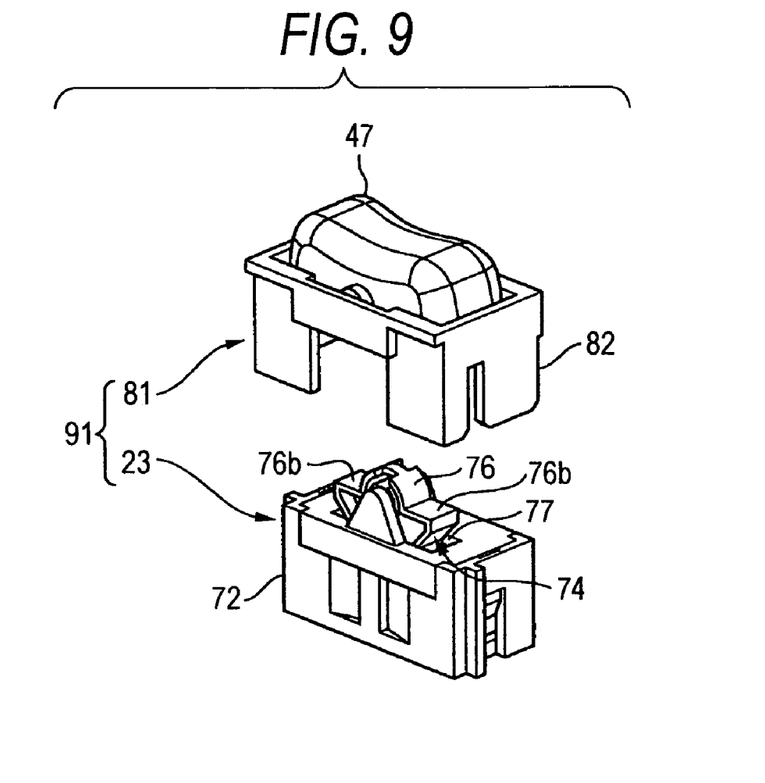
FIG. 9 is a perspective view of a switch unit of a second embodiment of a vehicle interior illumination lamp of the invention.
Figure 10:
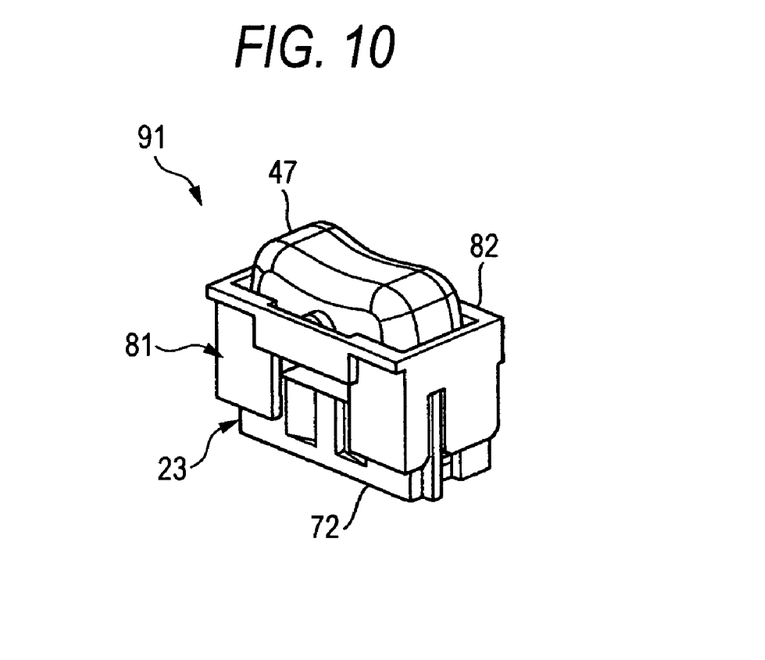
FIG. 10 is a perspective view of the switch unit of FIG. 9 in its assembled condition.
Figure 11:
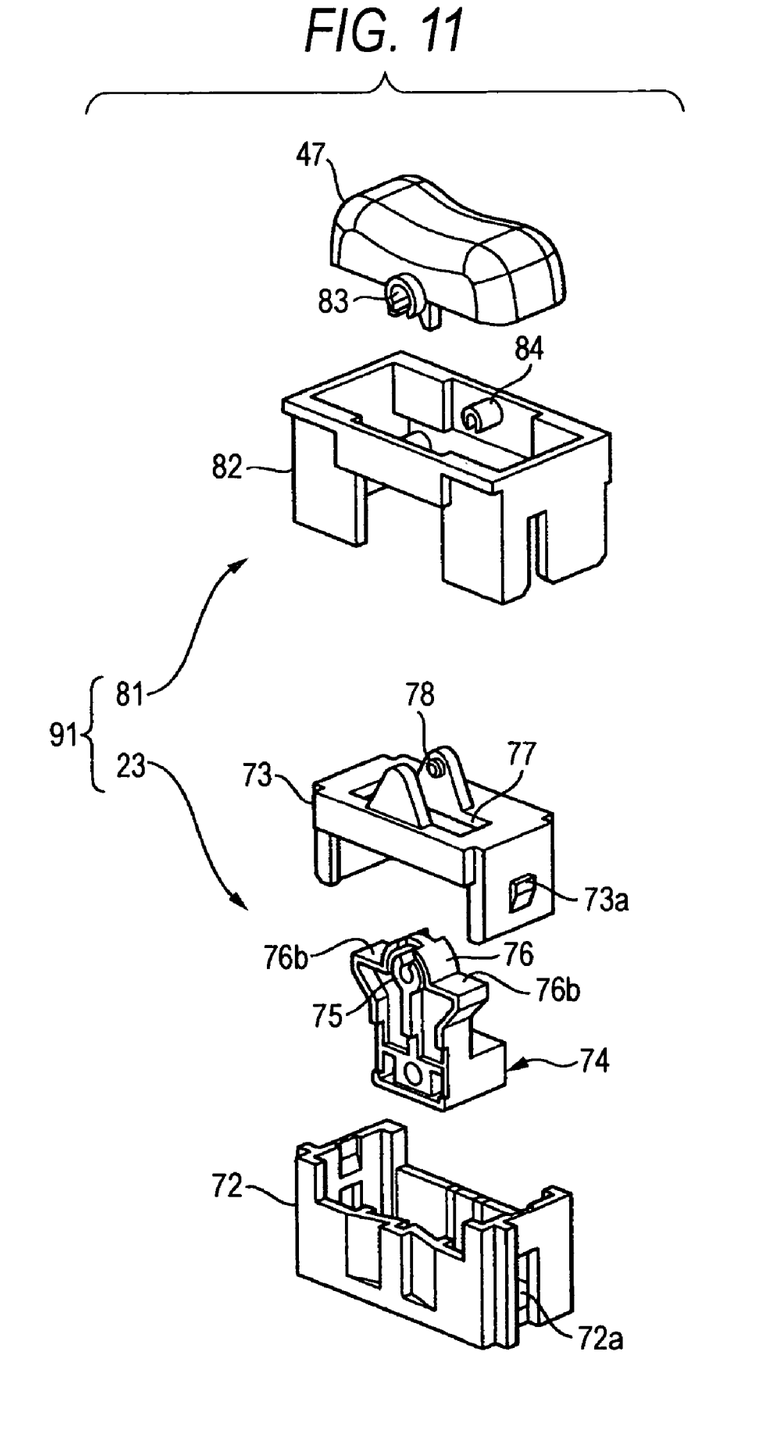
FIG. 11 is an exploded, perspective view of the switch unit of FIG. 9.
Figure 12:
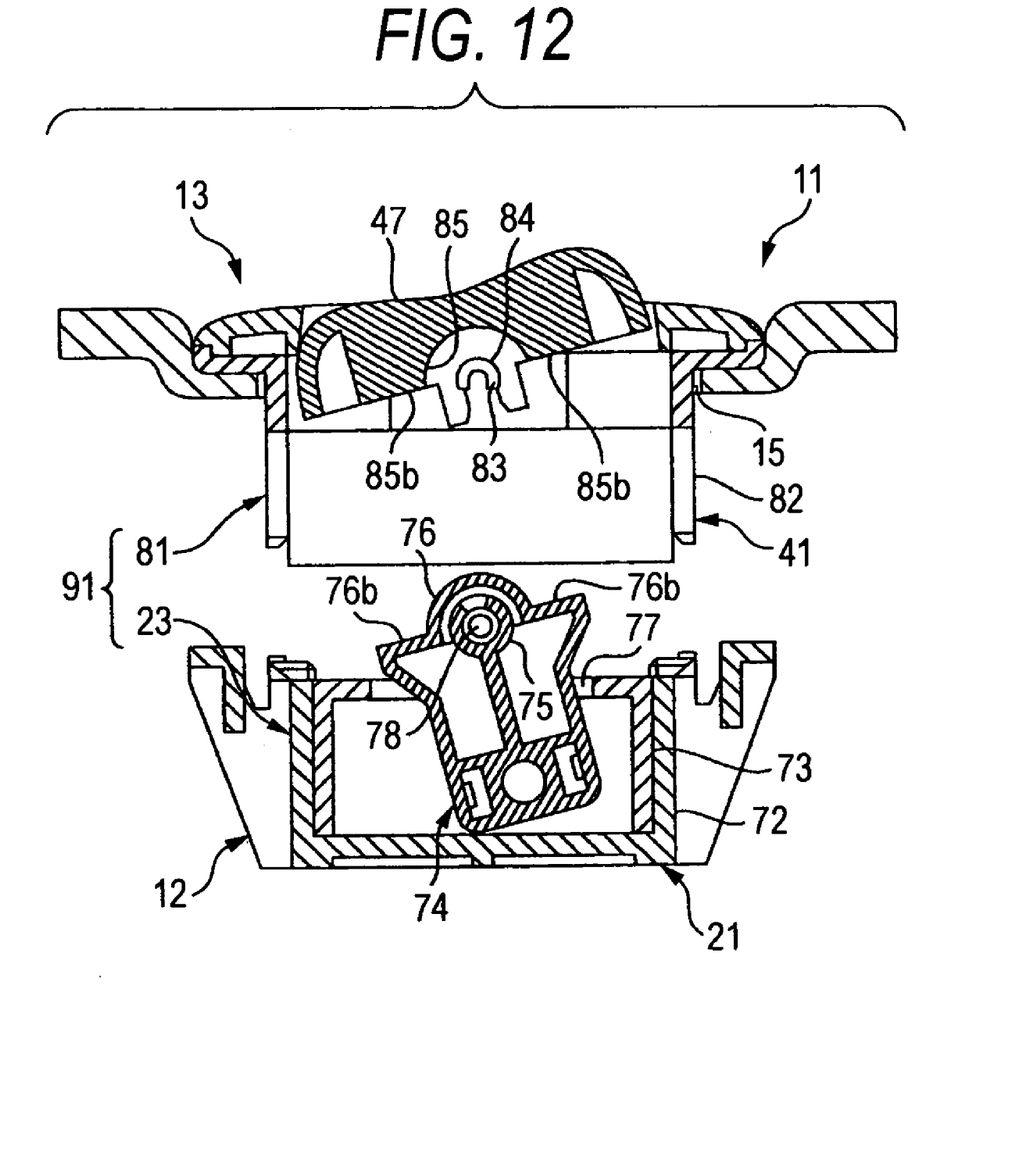
FIG. 12 is a cross-sectional view of the switch unit of FIG. 9.

Next, a second embodiment of a vehicle interior illumination lamp of the invention will be described. Those portions identical in structure to the corresponding portions of the above first embodiment will be designated by identical reference numerals, respectively, and explanation thereof will be omitted. FIG. 9 is a perspective view of a switch unit of the second embodiment of the vehicle interior illumination lamp of the invention, FIG. 10 is a perspective view of the switch unit of FIG. 9 in its assembled condition, FIG. 11 is an exploded, perspective view of the switch unit of FIG. 9, and FIG. 12 is a cross-sectional view of the switch unit of FIG. 9.

As shown in FIGS. 9 to 12, in the switch unit 91 of the vehicle interior illumination lamp 11 of this second embodiment, an engagement portion 76 of a switch lever 74 of a switch mechanism 23 has a distal end portion of a generally semi-circular cross-section, and a pair of abutment surfaces 76b are formed respectively at opposite sides of this distal end portion. The abutment surfaces 76b are defined respectively by horizontal surfaces disposed generally perpendicular to the engagement portion 76.

On the other hand, a switch knob 47 of an operating mechanism 81 includes an engaging portion 85, and this engaging portion 85 includes a generally channel-shaped groove of a generally semi-circular cross-section (which corresponds in shape to the distal end portion of the engagement portion 76 of the switch lever 74) formed in a bottom surface of the switch knob 47, and a pair of abutment surfaces 85b formed respectively at opposite sides of this channel-shaped groove.

The distal end portion of the engagement portion 76 of the switch lever 74 is fitted into the channel-shaped groove in the engaging portion 85 of the switch knob 47, and the abutment surfaces 76b of the engagement portion 76 of the switch lever 74 abut respectively against the abutment surfaces 85b of the engaging portion 85.

Figure 13:
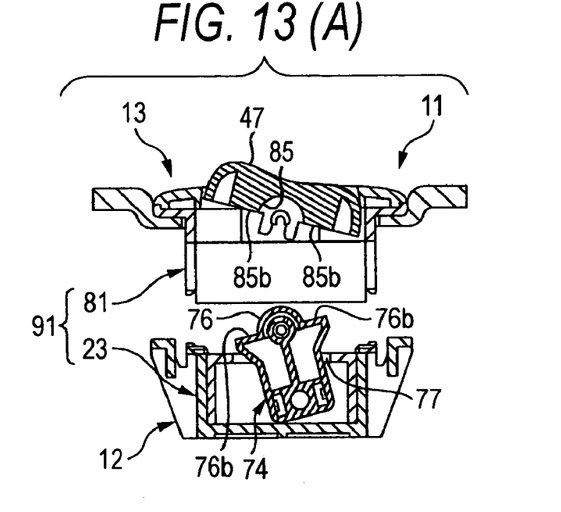
FIGS. 13A to 13C are cross-sectional views showing the procedure of assembling the switch unit of FIG. 12.
Figure 14:
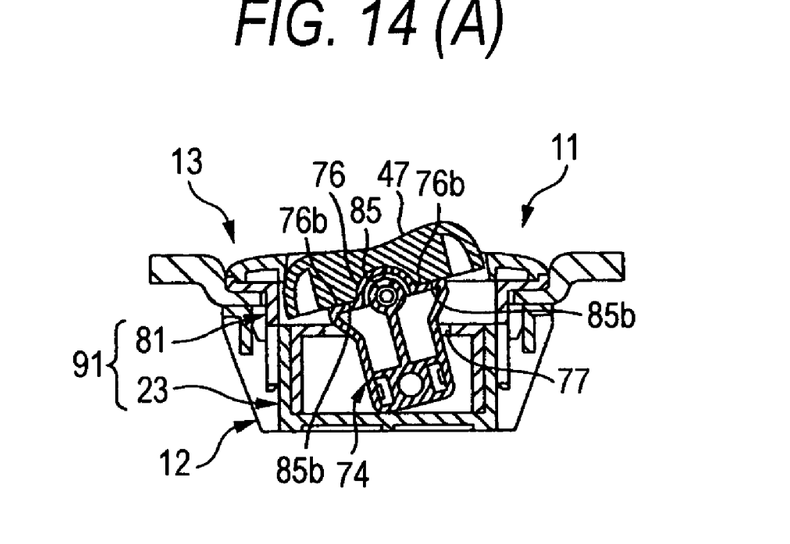
FIGS. 14A and 14B are cross-sectional views showing the procedure of disassembling the switch unit of FIG. 13C.

Next, a method of assembling the vehicle interior illumination lamp 11 will be described with reference to FIGS. 13 and 14. FIGS. 13A to 13C are cross-sectional views showing the procedure of assembling the switch unit of FIG. 12, and FIGS. 14A and 14B are cross-sectional views showing the procedure of disassembling the switch unit of FIG. 13C.

As shown in FIG. 13A, a function portion 12 is fitted on a design portion 13 fitted in an opening 15 in a ceiling plate 14.

In this operation, a switch base 72 of the function portion 12 is inserted into a base housing 82 of the design portion 13 as shown in FIG. 13B. At this time, if the switch knob 47 is inclined, the abutment surface 76b of the switch lever 74 abuts against the abutment surface 85b of the switch knob 47.

In this condition, when the function portion 12 is further pushed toward the design portion 13, the abutment surfaces 76b and 85b, held against each other, are pressed against each other, so that the switch knob 47 is pivotally moved. As a result, the switch knob 47 and the switch lever 74 correspond in inclination to each other as shown in FIG. 13C, and the distal end portion of the engagement portion 76 of the switch lever 74 is inserted into the channel-shaped groove in the engaging portion 85, and therefore the engagement portion 76 of the switch lever 74 is fitted in the engaging portion 85 of the switch knob 47, so that the switch lever 74 and the switch knob 47 are combined together in a unitary manner. Here, a resistance is imparted to the switch lever 74 because of contact of contacts (not shown) with each other, and therefore the switch knob 47 is pivotally moved.

At this time, also, retaining claws 51 on the design portion 13 are engaged respectively in retaining portions 34 formed in retaining plates 33 of the function portion 12, and also support surfaces 32, formed respectively on support portions 31 of the function portion 12, abut against an upper surface of the ceiling plate 14, so that the support surfaces 32 and a peripheral edge portion of a cover lens 42 of a housing 41 of the design portion 13 hold a peripheral edge portion of the opening 15 in the ceiling plate 14 therebetween.

In the thus assembled vehicle interior illumination lamp 11, the switch lever 74 and the switch knob 47 are combined together in an unitary manner, and in accordance with the pressing of the switch knob 47, the switch lever 74 is pivotally moved, so that the contacts are switched, thereby effecting and interrupting the supply of electric power to a bulb 22.

For disassembling the vehicle interior illumination lamp 11 in its assembled condition as shown in FIG. 14A, the engagement of the retaining claws 51 of the design portion 13 with the respective retaining portions 34 of the retaining plates 33 of the function portion 12 is canceled, and the function portion 12 and the design portion 13 are moved apart from each other.

In this operation, the engagement portion 76 of the switch lever 74 is withdrawn from the engaging portion 85 of the switch knob 47, and also the switch base 72 is withdrawn from the base housing 82, so that the function portion 12 and the design portion 13 are separated from each other.

As described above, in the vehicle interior illumination lamp 11 of the above embodiment, when the function portion 12 and the design portion 13 are combined together, shaft portions 78 are disposed in alignment with shaft portions 84, so that the axis of pivotal movement of the switch lever 74 coincides with the axis of pivotal movement of the switch knob 47. Therefore, in the operation for combining the function portion 12 and the design portion 13 together, it is not necessary to effect an operation for bringing the switch lever 74 and the switch knob 47 into registry with each other, and the efficiency of the operation for combining the function portion 12 and the design portion 13 together is greatly enhanced, thus enhancing the production efficiency.

While guiding the switch knob 47 into the proper mounting posture, using the abutment surfaces 76b of the engagement portion 76 of the switch lever 74 and the abutment surfaces 85b of the engaging portion 85 of the switch knob 47 as guide surfaces, the engagement portion 76 is fitted into the engaging portion 85, thereby combining the switch lever 74 and the switch knob 47 together in a unitary manner. Therefore, in the operation for combining the function portion 12 and the design portion 13 together, it is not necessary to beforehand bring the switch lever 74 and the switch knob 47 into agreement with each other with respect to their posture. Therefore, the efficiency of the operation for combining the function portion 12 and the design portion 13 together can be greatly enhanced, thus enhancing the production efficiency.

And besides, the switch lever 74 and the switch knob 47 are interlocked merely by fitting the engagement portion 76 into the engaging portion 85, and therefore for example, as compared with the case where the switch lever and the switch knob are interlocked through retaining projections or the like retaining them relative to each other, the efficiency of the operation for separating the function portion 12 and the design portion 13 from each other can be enhanced, and the maintenance can be easily effected.

The present invention is not limited to the above embodiment, and suitable modifications, improvements, etc., can be made. The shape, dimensions, numerical values, form, number, disposition, etc., of each of the constituent elements of the above embodiments are arbitrary, and are not limited in so far as the invention can be achieved.

What is claimed is:

1. A vehicle interior illumination lamp comprising:
   a function portion including a light source and a switch lever for effecting and interrupting the supply of electric power to said light source, said switch lever pivotally mounted on said function portion; and
   a design portion including a cover lens covering said function portion and a switch knob for operating said switch lever, and said switch knob pivotally mounted on said design portion,
   wherein when said function portion and said design portion are combined together, an axis of pivotal movement of said switch lever coincides with an axis of pivotal movement of said switch knob, wherein said switch lever has a first engagement portion, and said switch knob has a second engaging portion for fitting to said first engagement portion of said switch lever, said first engagement portion having a tapered v-shape and said second engagement portion having a shape complementary thereto; and
   wherein when said function portion and said design portion are combined together, said engaging portion and said engagement portion are fitted together, and said switch lever and said switch knob are guided into their mounting postures, respectively.

2. A vehicle interior illumination lamp comprising:
   a function portion including a light source and a switch lever for effecting and interrupting the supply of electric power to said light source, said switch lever pivotally mounted on said function portion; and
   a design portion including a cover lens covering said function portion and a switch knob for operating said switch lever, and said switch knob pivotally mounted on said design portion,
   wherein when said function portion and said design portion are combined together, an axis of pivotal movement of said switch lever coincides with an axis of pivotal movement of said switch knob,
   wherein said switch lever has a first engagement portion, and said switch knob has a second engaging portion for fitting to said first engagement portion of said switch lever, said first engagement portion having a projection and a pair of first substantially planar abutments surfaces on respective opposite sides of said projection and said second engagement portion having a shape complementary thereto including a projection recess for receiving said projection and a pair of second substantially planar abutment surfaces on respective opposite sides of said recess for respectively mating with said first abutment surfaces, and
   wherein when said function portion and said design portion are combined together, said engaging portion and said engagement portion are fitted together, and said switch lever and said switch knob are guided into their mounting postures, respectively.

* * * * *